United States Patent
Oda et al.

(10) Patent No.: US 6,865,834 B2
(45) Date of Patent: Mar. 15, 2005

(54) DISPLAY APPARATUS

(75) Inventors: Kumpei Oda, Shinjuku-ku (JP); Humihiro Arakawa, Shinjuku-ku (JP); Keiji Kashima, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/278,924

(22) Filed: Oct. 24, 2002

(65) Prior Publication Data

US 2003/0046839 A1 Mar. 13, 2003

Related U.S. Application Data

(63) Continuation of application No. 09/501,658, filed on Feb. 10, 2000, now abandoned.

(30) Foreign Application Priority Data

Feb. 10, 1999 (JP) .............................. 11-32572

(51) Int. Cl.⁷ .......................... G03B 25/02; G02B 27/10
(52) U.S. Cl. .......................... 40/454; 40/453; 359/621; 359/623; 359/625
(58) Field of Search ................. 40/453, 454; 359/619, 621, 622, 623, 624, 625, 626

(56) References Cited

U.S. PATENT DOCUMENTS

| | | |
|---|---|---|
| 3,884,554 A | 5/1975 | Lemelson |
| 4,420,221 A | 12/1983 | Sparks |
| 4,766,684 A | 8/1988 | Wah Lo |
| 5,146,703 A | 9/1992 | Boden |
| 5,359,454 A | 10/1994 | Steenblik et al. |
| 5,543,942 A | 8/1996 | Mizuguchi et al. |
| 5,712,731 A | 1/1998 | Drinkwater et al. |
| 5,880,887 A * | 3/1999 | Goto .......................... 359/626 |
| 5,896,093 A * | 4/1999 | Sjobom .................. 340/815.75 |
| 5,995,288 A * | 11/1999 | Kashima et al. ............ 359/599 |
| 6,014,232 A * | 1/2000 | Clarke ......................... 358/482 |
| 6,089,945 A | 7/2000 | Van Den Elzen |
| 6,330,112 B1 * | 12/2001 | Kaise et al. ................. 359/621 |
| 6,462,871 B1 * | 10/2002 | Morishima .................. 359/463 |

FOREIGN PATENT DOCUMENTS

| | | |
|---|---|---|
| JP | A-56-157310 | 12/1981 |
| JP | A-5-169015 | 7/1993 |
| JP | A-5-249453 | 9/1993 |

* cited by examiner

Primary Examiner—James M. Hewitt
(74) Attorney, Agent, or Firm—Oliff & Berridge, PLC

(57) ABSTRACT

A display apparatus has a lens sheet with a plurality of unit columnar lenses arranged so as to be parallel to one another, and is disposed on the observation side of a display panel, spaced therefrom by a layer of air. The direction of the ridge lines of the unit columnar lenses of the lens sheet, seen from the observation side, are non-parallel to the direction of an edge of the display panel.

7 Claims, 8 Drawing Sheets

DISPLAY APPARATUS

This application is a continuation of U.S. patent application Ser. No. 09/501,658, filed Feb. 10, 2000, now abandoned.

BACKGROUND OF THE INVENTION

1. Field of the Invention

The present invention relates to a display apparatus using a lens sheet that, by the refraction action of a unit columnar lens or a unit lens, provides increased widening of light from a display panel.

2. Description of the Related Art

In a display device, and particularly in a liquid-crystal display device, the contrast at the viewing line of an observer thereof is lowered at an inclination from the normal direction to the screen, in comparison with the contrast at the normal direction, leading to problems such as a lowering of the visibility of the screen.

In recent years, with an increase in the screen size of liquid-crystal displays, there has been a desire to improve the visibility of the screen when it is viewed at an inclination. Based on this desire, and as disclosed, for example, in Japanese Unexamined Patent Application publication H5-249453, there has been proposed the use of a microlens array on the observed side of a liquid-crystal display, so as to broaden the viewing angle.

FIG. 18 shows an example of a lenticular lens sheet 1 of the past. A typical configuration is one with what are called black stripes, wherein light from an incident light surface is collected by a lens part 2 formed by lenticular lenses or the like, the focal point region of the lens part 2 being made the light-exiting surface, on a part of which are formed light non-exiting parts (black stripes) 3, so that light is diffused and the influence of external light is reduced. Because this type has black stripes 3, when laminated with a device having, for example, the matrix of a liquid-crystal display, there is a particular tendency for a fringe pattern caused by the Moire effect to occur, making it particularly necessary to have a means of suppressing this stripe pattern.

As disclosed in the above-noted Japanese Unexamined Patent Application publication H5-249453, a sheet onto one side of which only is formed a microlens array is provided on the observation side of the liquid-crystal display element, with the side opposite the microlenses on the observation side and, while this broadens the viewing angle, external light is totally reflected by the microlenses, so that the sheet itself appears to shine, thereby actually leading to a lowering of the contrast.

When using a lenticular lens as a microlens array in display having a matrix formed on the surface thereof, such as a liquid-crystal display (LCD), a plasma display panel (PDP), an electroluminescent display (ELD), or a field emission display (FED) or the like, depending upon the positional relationship between the lenticular lens and the matrix, there was the problem of Moire fringes being observed on the screen. Additionally, depending upon the distance between the microlens array and the display device, there was the problem that the display could actually become more difficult to view.

A problem pointed out as occurring when using a lenticular lens sheet having black stripes as a viewing angle widening sheet for a display was that, if the exiting angle of light from the display is wide, the collection of light at the lens part does not function well, absorption occurring in the black stripes, thereby reducing the efficiency.

SUMMARY OF THE INVENTION

Accordingly, it is an object of the present invention, in view of the above-noted drawbacks of the prior art, to provide a display apparatus with good visibility and without the occurrence of Moire fringes. It is a further object of the present invention to provide a display apparatus that prevents reflection of external light, and also suppresses the occurrence of the Moire effect.

An aspect of the present invention is a display apparatus having a lens sheet, which has a parallel arrangement of a plurality of unit columnar lenses, disposed on the observation side of a display panel, spaced from the display panel by a layer of air. The above-noted object is achieved by having the direction of ridge lines of unit columnar lenses arranged so that, seen from the observation side, they are non-parallel to the edges of the display panel, thereby suppressing the occurrence of the Moire effect.

In the above-noted display apparatus, if the direction of the ridge lines of the unit columnar lenses is made to intersect with the edges of the display panel at an angle in the range 5 to 85°, and particularly at an angle of 45°, it is possible to further suppress the occurrence of the Moire effect.

Another aspect of the present invention is based on the knowledge that, depending upon the distance between the microlens array and the display surface of the display apparatus, there is a prominent worsening of the visibility of the display unless the focal point position of the microlens array and the display surface position of the display apparatus coincide. In this aspect of the present invention, a lens sheet having a plurality of unit columnar lenses arranged in parallel or a plurality of unit lenses is disposed on the observation side of the display panel, spaced from the display panel by a layer of air, the focal point position of the unit columnar lenses or the unit lenses and the display surface of the display panel being made to substantially coincide, so that the object of improving visibility is achieved.

In the above-noted display apparatus, with convex lenses as the unit columnar lenses or the unit lenses, the lens sheet is disposed so that the convex surfaces of the unit columnar lenses or the unit lenses faced toward the display panel.

In the above-noted present invention embodies the idea of lightly coloring the lens part, so as to cause absorption of reflections of external light, and of forming the colored layer along the convex shapes of the lenses, making it possible to prevent external light reflections without sacrificing light transmissivity, while providing highly effective suppression of the Moire effect.

To achieve the above, a colored layer was provided in the above-noted display apparatus, at the boundary of the lens sheet with the air layer.

In the present invention, a lens sheet having a plurality of unit columnar lenses arranged in parallel or a plurality of unit lenses is disposed on the observation side of a display panel, spaced away from the display panel by a layer of air. In this display apparatus, a colored layer is provided a the boundary of the lens sheet with the air layer, thereby achieving the above-noted object. By providing this colored layer at the boundary part, it is possible to provide good prevention of reflections of external light without much reduction in the light transmissivity.

In the above-noted display apparatus, the colored layer can also be formed along the shape of the unit columnar lenses.

In the above-noted display apparatus, when the colored layer is provided at the border between the air layer and the lens sheet, it is desirable to make the light transmissivity of the lens sheet 40 to 70%, thereby providing even better suppression of reflections of external light.

In the present invention, a lens sheet having a plurality of unit columnar lenses arranged in parallel is disposed on the observation side of a display panel, spaced away from the display panel by a layer of air. In this display apparatus, a matte layer having minute protrusions is formed on at least one surface of a pair of opposing surfaces of the lens sheet and the display panel, the friction force thereof supporting the lens sheet on the display panel, thereby achieving the above-noted object.

In the above-noted display apparatus, the minute protrusions may be higher than the interference thickness between the pair of opposing surfaces of said lens sheet and said display panel.

In the above-noted display apparatus, on at least one of the lens sheet and the display panel, at least one layer that is a light-diffusing layer, anti-reflection layer, antiglare layer, static electricity-preventing layer, hard-coat layer, contamination-preventing layer, or a touch panel can be formed.

DESCRIPTION OF PREFERRED EMBODIMENTS OF THE INVENTION

A display apparatus 10 according to an embodiment of the present invention is described in detail below, with reference to relevant drawings.

Figure 1:
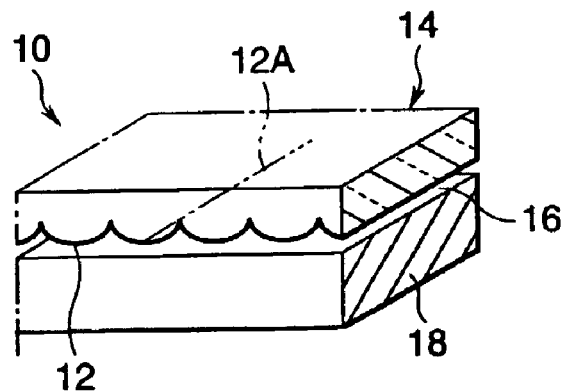
FIG. 1 is a simplified perspective view showing the main part of a display apparatus according to an embodiment of the present invention.
Figure 2:
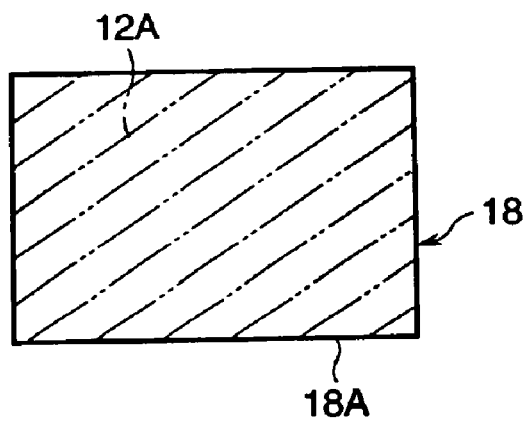
FIG. 2 is a plan view showing the relationship between the display panel and the unit columnar lenses in the display apparatus of FIG. 1.
Figure 3:
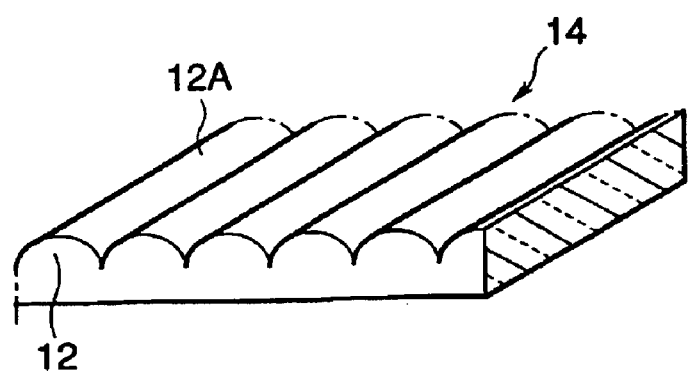
FIG. 3 is a plan view showing the lens sheet of the display panel of FIG. 1.

The display apparatus 10, as shown in FIGS. 1 and 2, has a lens sheet 14 having a plurality of unit columnar lenses 12 arranged in parallel, disposed on a display panel 18, with an intervening air layer 16 therebetween. The direction of the ridge lines 12A of the unit columnar lenses 12, as seen from the observation side (from the top as shown in FIG. 1), is non-parallel with respect to the edges 18A of the display panel 18. The lens sheet 14, as shown in FIG. 3, is a single piece, the cross-section of which shows a plurality of semicircular unit columnar lenses 12, the ridge lines 12A of which are parallel to one another.

It is preferable from the standpoint of suppressing the Moire effect, that the pitch between the unit columnar lenses 14 of the lens sheet 12, rather than being the same as the pitch of the matrix of the display panel, to be described below, be significantly different therefrom, and it is particularly desirable that this pitch be at least $1/1.5$ of the pixels in the display panel 18.

Figure 5:
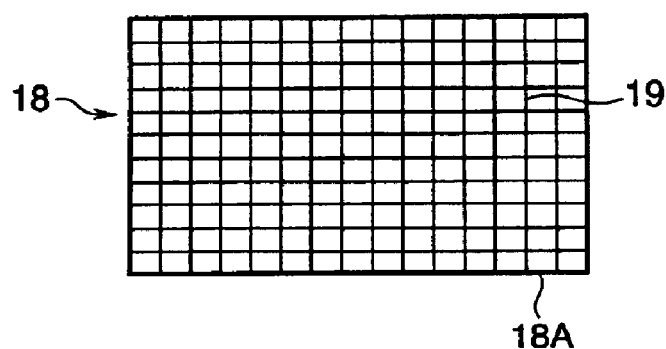
FIG. 5 is a plan view showing a matrix of a display panel of a display apparatus.

To drive the display apparatus 10, as shown in FIG. 5, the display apparatus 10 is provided with scanning electrodes, pixel electrodes, and the like that run in parallel with or perpendicular to the edge 18A of the display panel 18, these electrodes being connected by the electrical signal lines 19.

The material used for the lens sheet 14 can be a material with good transparency, such as polyester resin such as polyethylene terephthalate or polybutylene terephthalate, an acrylic resin such as polymethyl acrylate, a thermoplastic resin such as polycarbonate resin, polystyrene resin, or polymethyl pentene resin, an oligomer and/or an acrylic monomer such as polyester acrylate, urethane acrylate, or epoxy acrylate, which can be cured by means of either ionizing radiation or a resin which can be cured either ultraviolet light or electromagnetic radiation.

In the case of using such a resin, a material having an index of refraction of approximately 1.4 to 1.6 is normally used. Even in the case of a non-resin material, as long as the material has transparency, it is possible to use glass or ceramic or the like.

As a method of manufacturing the lens sheet, it is possible to apply the method of thermal pressing a single-layer optical sheet (intermediate sheet before coating), by the method of thermal pressing a thermoplastic resin disclosed, for example, in the Japanese Unexamined Patent Application publication S56-157310, or the method of extrusion, the method of injection molding of a resin curable by ultraviolet or heat, or other such methods.

Another method other than the intermediate sheet methods noted above is, for example as disclosed in the Japanese Unexamined Patent Application publication H5-169015, the method of filling a modeling roll having the reverse shape of the concavities (more precisely, concavities and convexities) of the desired shape of the lens arrangement with a liquid resin that is curable by ionizing radiation, superposing this over a transparent base material sheet, and subjecting the resin to an ionizing radiation such as ultraviolet light or an electron beam via the transparent base material sheet side, so as to cure the resin, after which the transparent base material sheet is peeled from the modeling roll along with the cured resin, resulting in the cured resin being formed on the transparent base material sheet with the desired shape of lens arrangement. The overall thickness of the lens sheet is usually approximately 20 to 1000 μm.

In the present invention, because the direction of the ridge lines 12A of the unit columnar lenses 12 of the lens sheet 14 disposed on the observation side of the display apparatus is arranged so as to be non-parallel with respect to the direction of the edges 18A of the display panel 18, it is possible to suppress the occurrence of Moire fringes.

In particular if the angle formed between the direction of the edges 18A of the display panel 18 and the direction of the ridge lines 12A of the unit columnar lenses 12 of the lens sheet 14 disposed on the observation side of the display panel 18 is 5 to 85°, or more preferably 45°, there is good suppression of the occurrence of the fringe pattern.

While the lens sheet 14, as shown in FIG. 3, is constructed integrally with a plurality of unit columnar lenses 12 having semicircular cross-sectional shapes and arranged in parallel with one another, the present invention is not restricted in this manner, and can also make use of a plurality of unit lenses having a cross-sectional shape that is a sine curve, a concave-lens shape, or an elliptical shape, as long as the axis lines thereof are arranged next to one another so as to be mutually parallel in one direction.

Figure 4:
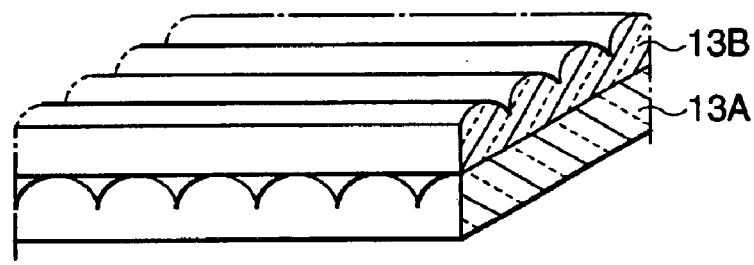
FIG. 4 is a perspective view showing another form of the lens sheet of FIG. 3.

By using, as shown in FIG. 4, a laminate formed by two superposed lens sheets 13A and 13B, it is possible to further enhance the effect of widening the angle of view. The top and bottom lens sheets 13A and 13B are arranged so that the ridge lines of the unit lenses of each are mutually perpendicular, when seen in a plan view (from the top in FIG. 4).

A second embodiment of the present invention is described in detail below, with reference to the drawings.

Figure 6:
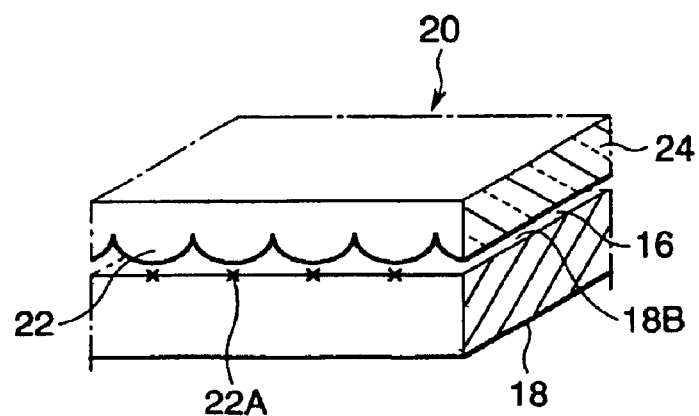
FIG. 6 is a simplified perspective view, similar to that of FIG. 1, showing a display apparatus according to the second embodiment of the present invention.

The display apparatus 20 of the second embodiment, as shown in FIG. 6, has a lens sheet 24 having a plurality of unit columnar lenses 22 provided on the observation side of the display panel 18, with an intervening air layer 16, the position of the focal point of the unit columnar lenses 22 substantially coinciding with the display surface 18B of the display panel 18.

Figure 7:
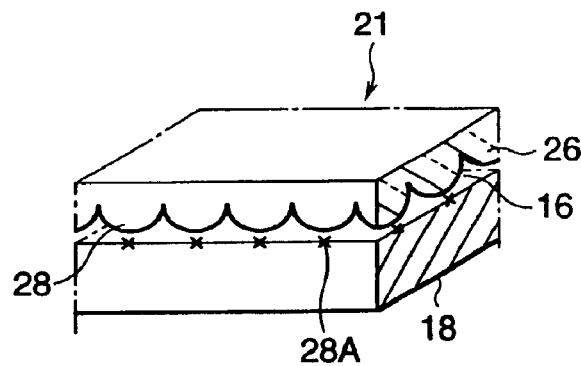
FIG. 7 is a simplified perspective view, similar to FIG. 1, showing a display apparatus according to the fourth embodiment of the present invention.
Figure 8:
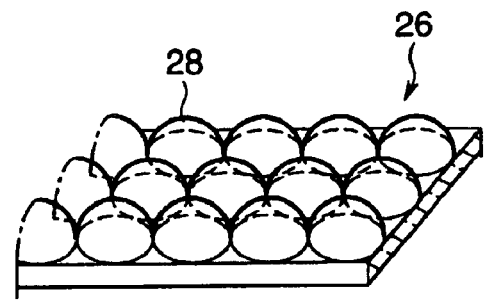
FIG. 8 is a perspective view showing a lens sheet according to the fourth embodiment.

Because the material and method of manufacturer of the lens sheet 24 are the same as described above with regard to the above example, they will be omitted herein. While the lens sheet 24, similar to the lens sheet 14 shown in FIG. 3, has a plurality of unit columnar lenses having semicircular cross-sectional shapes, and arranged so as to be parallel to one another, it is also possible, as shown as the lens sheet 26 of a display apparatus 21 according to the third embodiment shown in FIGS. 7 and 8, to arrange a plurality of unit lenses 28 having semicircular cross-sectional shapes in two dimensions. In FIG. 7, the reference numeral denotes the focal point 28A of the unit lens 28. The shape of the unit lens 28 is not limited to that indicated above, and can also be a cross-sectional shape that is a sine curve, a concave-lens shape, or a semielliptical shape, as long as the axis lines thereof are arranged next to one another so as to be mutually parallel in one direction.

From the standpoint of suppressing the occurrence of the Moire effect, it is preferable that the pitch of the unit lenses 22 of the lens sheet 24, rather than being the same as a matrix of the display panel 18, to be described below, be significantly different therefrom.

In both the second and the third embodiments, the lens sheet can be formed as a laminate of two sheets, thereby more effectively widening the viewing angle.

Next, an embodiment of the present invention with regard to coloring of the lens part of the lens sheet will be described in detail, with reference to the drawings.

Figure 9:
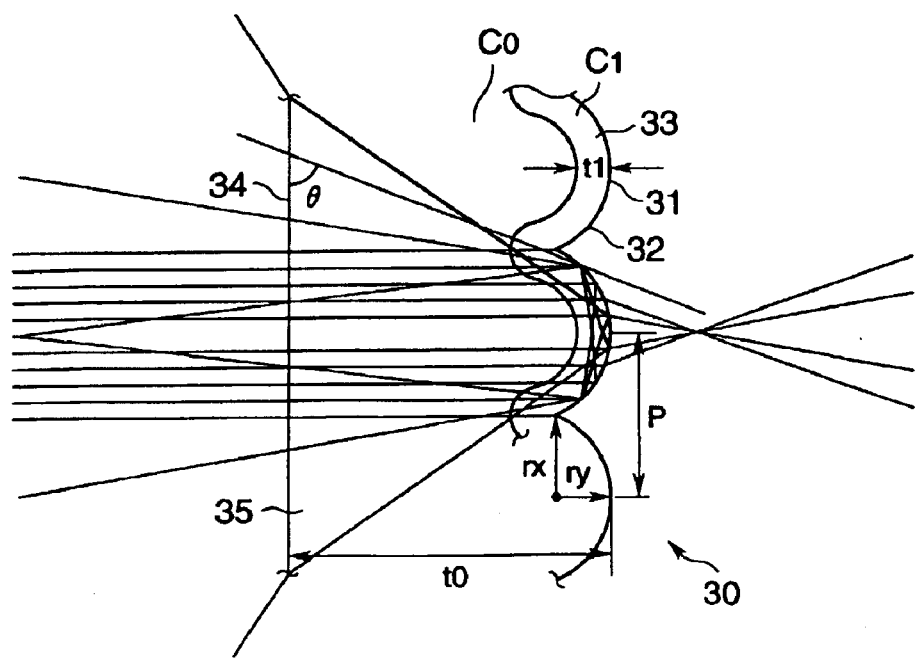
FIG. 9 is a simplified perspective view, showing another embodiment of a lens sheet according to the present invention, including the light path.

In this embodiment of a lens sheet, the first example of a lens sheet 30, as shown in FIG. 9, has lens parts 32, having a convex lens shape, formed on the light-entry surface 31, a colored layer 33 being formed along the light-entry surface 31 of the lens part 32. The base material layer 35 in the lens sheet 30 is the layer from the colored layer 33 to the light-exiting surface 34.

The colored layer 33 has the function of increasing the contrast, even for the light-entry surface as described below.

The function of the colored layer will be described with reference to FIG. 10(A), which as a light path drawing that shows a comparison with the case of a lens sheet 60 shown in FIG. 10(B), in which the entire lens part is colored (body colored type).

The body colored type lens sheet 60 is a light-entry single-sided lens sheet, in which a base material layer 65 including the entire lens layer is colored, wherein an external light D1 that enters from the observation side is totally reflected by the lens part 62 formed on the light-entry surface, with the external light D4 exiting once again on the observation side. When this occurs, the external light D1 is repeatedly totally reflected along the inside surface of an arc of the lens part 62 (D1→D2→D3→D4). Denote C shows an image light and E shows a reflected light of the external light B or D at a light-exiting surface 34 or 64.

Because the lens sheet 30 of this embodiment has a colored layer 33 along only the light path of this full reflection, the light path length of the external light B within the colored layer 33 is 5 to 10 times longer than the light path length of the image light A within the colored layer 33. With the body colored type of lens sheet 60, however, these ratio is at most 2 to 3 times. For this reason, the lens sheet 30 of the present invention enables suppression of reflection of the external light B without reducing the intensity of the image light A, thereby providing an image with good contrast.

The lens sheet 30 of this embodiment efficiently absorbs the external light B that is totally reflected by the lens part 32 of the light-entry surface 31. The lens part 32, therefore, needs to have a location at which the angle $\phi$ shown in FIG. 11 is at least an inclination that is the critical angle (approximately 42°), and in the case of a lens having no inclination this great, it is not possible to have an advantage in comparison with the body colored type of lens sheet 60 as shown in FIG. 10(B).

Figure 11:
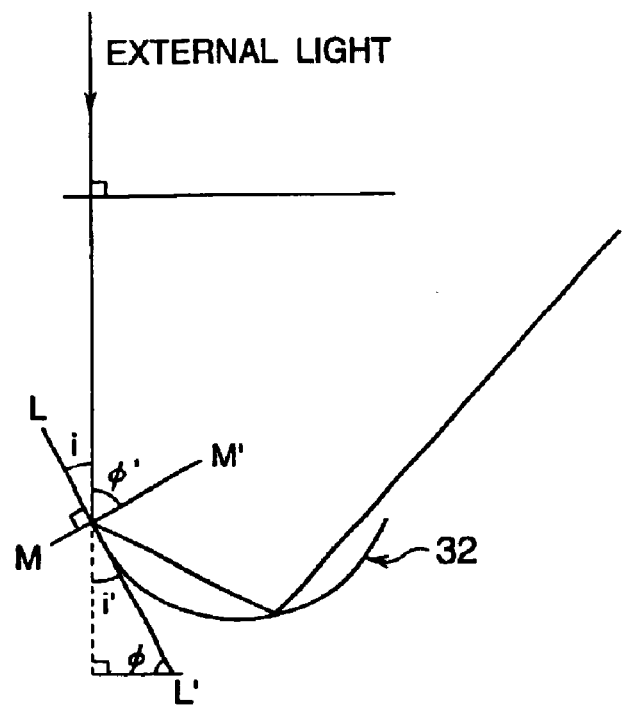
FIG. 11 is a light path drawing showing the angular relationship with respect to the screen surface in the above-noted lens sheet.

FIG. 11 illustrates that the angle of incidence $\phi$ when external light perpendicularly incident to the lens sheet exits from the light-entry lens or when it is totally reflected by the light-entry lens is equal to the lens angle with respect to the light-entry surface of external light at this position. In FIG. 11, because the tangent line L–L' and the normal line M–M' intersect perpendicularly, and i=i', $\phi=\phi'$.

Therefore, to cause external light to be totally reflected at the light-entry surface, it is necessary to have a light-entry lens with a position at which the lens angle $\phi$ that is greater than the critical angle $\sin-1$ (1/n) (where n is the index of refraction of the lens sheet).

However, because at an inclination of approximately 42° it is possible to obtain only a diffusion angle of approximately 25°, in order to achieve a diffusion angle of 40° or greater, it is usually desirable that the shape of the lens part 32 have a position that has the angle $\phi$ of greater than approximately 60°.

The coloring of the colored layer 33 can be done with a dye or slight amount of pigment, which is either mixed into or dispersed throughout the molding resin of the lens sheet 30.

The color of the coloring can be made a neutral color such as gray, or can be selected so as to selectively absorb or transmit a specific color, so as to achieve a balance of the primary colors (red, green, and blue) in the spectrum of the light source.

The color density of the colored layer 33 is such that the color density of the light-exiting part (base material layer 35) is higher than the colored layer 33, and it is preferable to have the color density of the base material layer 35 be either zero or limited to a low value, in order to suppress the influence of external light, without losing much transmissivity of projected light from the light source.

Figure 12:
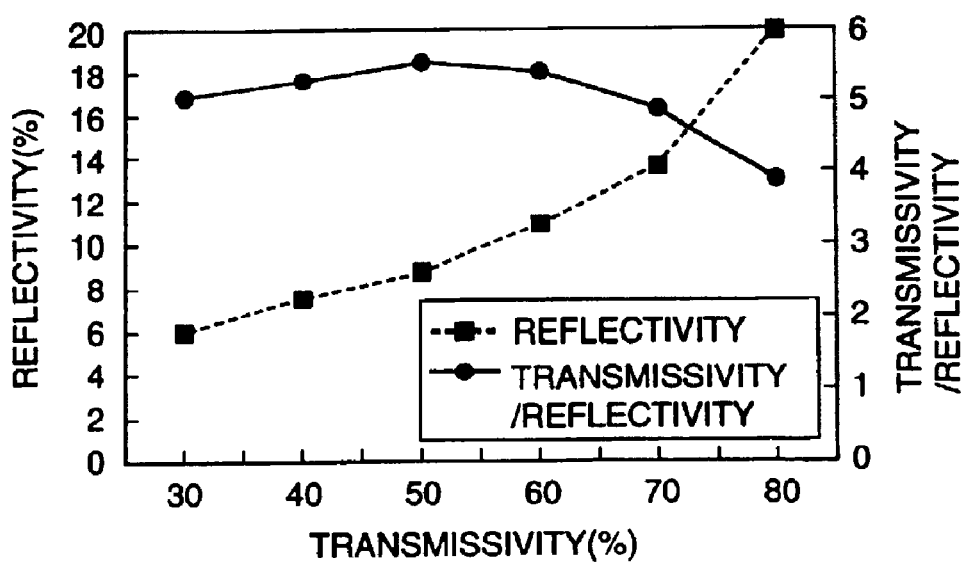
FIG. 12 is a graph showing the relationship of the above-noted lens sheet to transmissivity.

FIG. 12 is a graph that shows the relationship between the transmissivity and contrast of the lens sheet 30 of this embodiment. It is preferable that the color density be such that the transmissivity is in the range 40 to 70%. If the color density is made low, so that the transmissivity exceeds 70%, although there is an improvement in transmissivity, there is an accompanying increase in the intensity of external light that is totally reflected at the lens part 32 and returned to the observation side, thereby making the contrast worse.

If, on the other hand, the color density is made high, so that the transmissivity is less than 40%, this just worsens the transmissivity of the image light, so that the external light reflections at the light-exiting surface 34 appear relatively more prominent, thereby worsening the contrast.

More specifically, FIG. 12 is a plot of the results of fabricating a single-sided lens sheet provided with a thin colored layer on the light-entry side, with various color densities, and using a spectrometer (Shimadzu Seisakusho Model UV2100) to measure the corresponding transmissivities and reflectivities, with the reflectivity and the ratio of transmissivity to reflectivity (transmissivity/reflectivity) plotted with respect to transmissivity.

Reflectivity is represented on the left axis, and the ratio of transmissivity to reflectivity is represented on the right axis. By reducing the color density, the transmissivity of the lens sheet increases. However, from about the point at which the transmissivity exceeds 70%, the reflectivity increases sharply. This is because the thinning color density is no longer able to sufficiently absorb external light.

Because the lens sheet of the present invention does not absorb external light reflected at the observation side (light-exiting surface), even in the case in which the density of the coloring is made high, so that the transmissivity decreases, the ratio between the transmissivity and the reflectivity progressively decreases and, when the ratio of the transmissivity to the reflectivity is 50%, there is a peak, on both side of which there is a decrease. It is therefore preferable that coloring be done so as to make the transmissivity 40 to 70%.

It is preferable that the colored layer 33 has a thickness t1 which is 0.5 to 1.0 times the pitch p of the unit columnar lenses 12. It is also preferable that the thickness t1 be ½ the thickness to of the lens sheet 30, or smaller. Both of these conditions are preferable so as to form a colored layer 33 on the part through which the external light passes.

Figure 13:
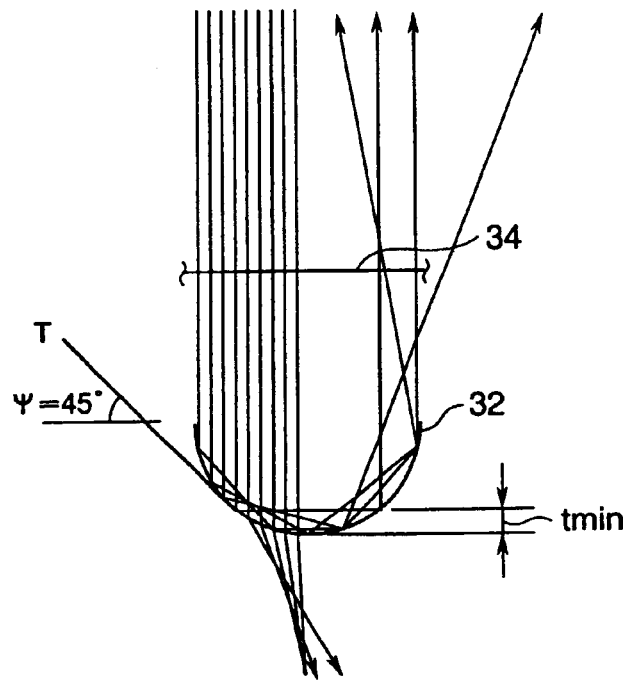
FIG. 13 is a light path drawing showing quantitative optimization of the thickness of the colored layer of the above-noted lens sheet.

FIG. 13 is a graph illustrating the optimized value of the thickness of the colored layer of the lens sheet 30 in this embodiment.

Because the lens sheet 30 of this embodiment uses the repeated total reflection of external light incident from the light-exiting surface (observation side) along the lens part 32, it is desirable that the colored layer 33 be formed along the lens part 32.

In this case, the minimum geometrical thickness tmin of the colored layer 33 is equal to the height of the lens at the point at which the inclination of the tangent to the lens part 32 is at an angle of Ψ=45° and, if the cross-sectional shape of the lens part 32 is an ellipse, it is possible to calculate this by Equation (1)

$$t1 = b6^2(a6^2+b6^2)6^{1/2} \qquad (1)$$

In the above, a and b are the short (minor) and long (major) diameters of the ellipse. Under these conditions, the contrast is best.

In the case of an elliptical lens having a conical coefficient of k=0.45 (=a6²/b6²−1), and a lens angle of approximately 60° at the fringe thereof, t1 is approximately ⅒ of the pitch of the lens shape.

Figure 10A:
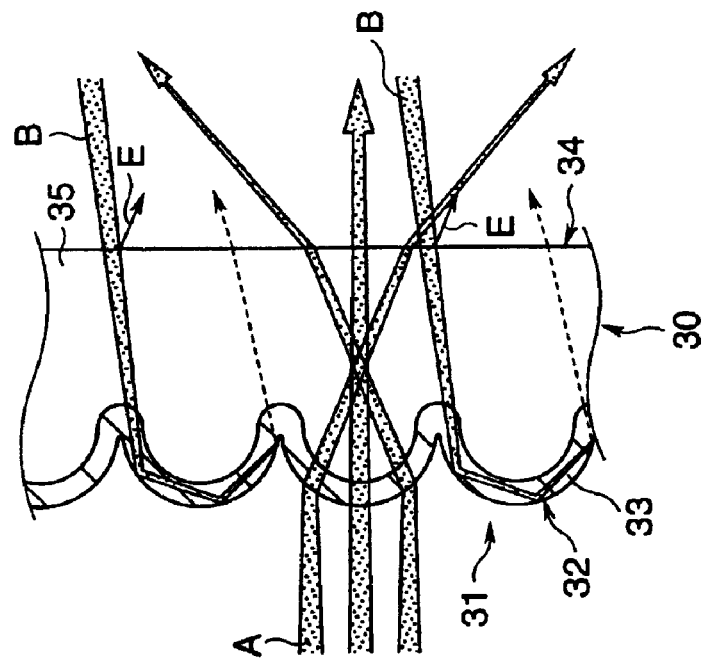
FIG. 10 is a light path drawing showing a comparison between the above-noted lens sheet and a lens sheet of the past.
Figure 10B:
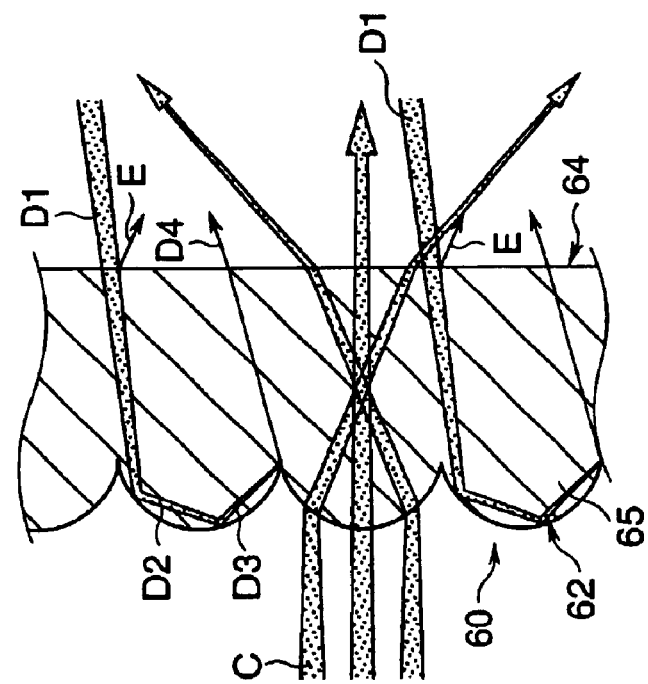
Figure 14A:
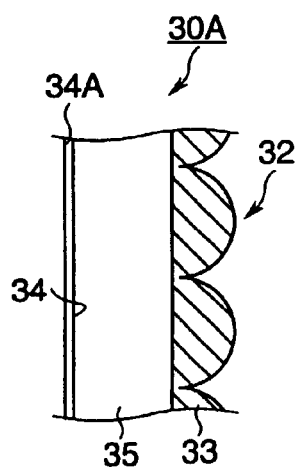
FIG. 14 is a simplified cross-section view, similar to that of FIG. 9, showing another embodiment of a lens sheet according to the present invention.

For a colored layer 33 that does not follow the shape of the lens, for examples as in the lens sheet 30A shown in FIG. 14(a), in which the boundary between the colored layer 33 and the base material layer 35 is a flat surface, as can be predicted from the ratios of FIG. 10(A) and FIG. 10(B), a lens sheet IOA that is better than the body colored type is obtained. In this case, because the colored layer 33 has the effect of approaching the lens part 32, the thickness of the colored layer 33 is preferably less than the pitch of the lenticular lens shapes, and preferably less than ½ the sheet thickness.

Figure 15:
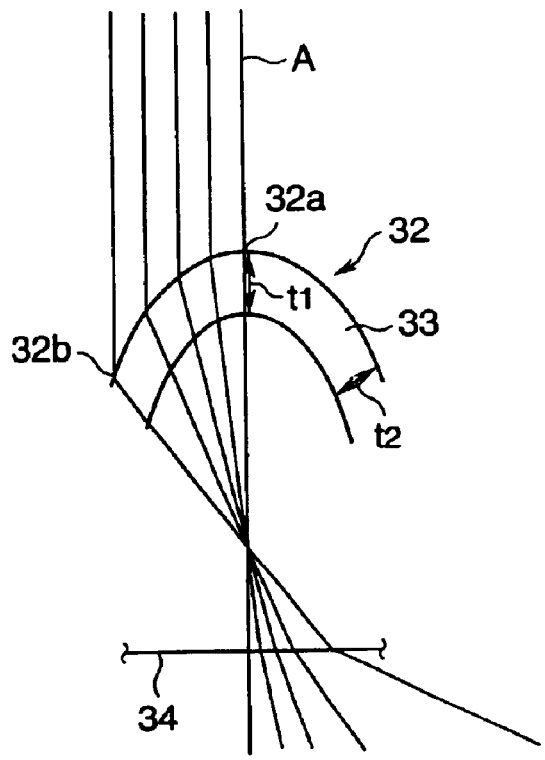
FIG. 15 is a light path drawing showing the relationship between the thickness of the colored layer within one lens of the lens sheet and the incident light.

FIG. 15 is a drawing that shows the thickness of the colored layer 33 of the lens sheet 30 of this embodiment. In the colored layer 33, in one lens part 32, the thickness t2 of the fringe part is preferably less than the thickness at the peak part (t1>t2). If the colored layer 33 is formed so as to have a uniform thickness, the light path of image light incident to the fringe part 32b is longer than the light path of light path of image light within the colored layer 33 that is incident from the peak part 32a of the lens part 32, so that there is greater absorption. As a result, the intensity of light that exits at an angle of 30 to 40° is decreased.

A light-diffusing substance can also be added to the colored layer 33 of the lens sheet 30. This light-diffusing substance can be glass beads, an organic bridged polymer, or the like. The light-diffusing substance is added to the molding resin of the lens sheet 30 in an amount of 8% of weight, and achieves a desirable diffusion of light from the light source 2.

While the light-diffusing substance can also be mixed into the entire lens sheet 30, if there is light-diffusing substance on the observation side from the colored layer 33, external light will be diffused at that point, so that the external light will return to the observation side before it reaches the colored layer 33. For this reason, it is preferable to make the light-diffusing substance in the base material layer 35 sparse. That is, if the concentration of the light-diffusing substance mixed in the colored layer 33 is C1 and the concentration of the light-diffusing substance mixed in the base material layer 35 is Co, it is desirable that the relationship 0≦Co<C1 be established.

In the case in which a film having the function of an anti-reflection layer, a polarizing filter layer, or a hard coating layer or the like, to be described later, is laminated, it is preferable that the light-exiting surface 34 be a flat surface. In this case, not mixing a diffusing substance into the base material layer 35 makes it easier to form the laminate.

Figure 14B:
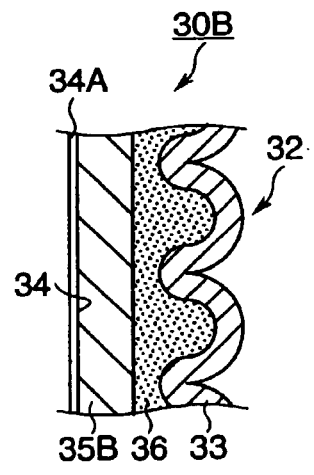

In the case in which, as in the lens sheets 30B and 30C shown in FIGS. 14(b) and (c), a diffusing substance is not mixed into the colored layer 33 of the light-entry surface, and an intermediate diffusing substance layer (intermediate layer) is formed, the above-noted diffusing substance can also be used to form, on the observation side, a colored layer having a low concentration for absorbing reflected light.

In the lens sheet 30 (including 30A, 30B, and 30C), the light-exiting surface 34 is a flat surface or a matte surface. In the case of a matte surface, it is possible to achieve a clear-appearing image.

If the light-exiting surface 34 is a flat surface, it is possible to provide a layer 34A which is an anti-reflection layer, a low-reflection layer, a polarizing filter layer or the like to achieve an even higher contrast. It is additionally possible to form a hard coating layer, an anti-glare layer, a static electricity preventing layer or the like as the layer 34A on the light-exiting surface 34. If the light-exiting surface 34 is a matte surface, there is the advantage of an antiglare effect, preventing reflections of objects in the screen. Additionally, it is possible to provide a touch panel as the layer 34A.

Next, a method of manufacturing the above-noted lens sheet will be described. The lens sheet of the present invention, for example, is formed by placing a roll-type die of the light-entry surface shape having the reverse shape of the lens sheet and a roll-type die of the light-exiting surface shape having a flat or matte shape surface in parallel with one another, and extruding two layers between these two, a colored resin on the light-entry surface side and a transparent resin or resin having a fainter coloring than the colored resin on the light-exiting surface side. It is also possible to use similar dies, between which is extruded a resin, a colored film being guided so as to follow along the light-entry surface side die, thereby forming a laminate with the colored film. The lens sheet of the present invention can also be made using a colored resin curable with ultraviolet light, with the lens layer being formed on the film base material.

Next, the lens sheets 30A, 30B, and 30C of another embodiment of the present invention will be described in further detail, with reference being made to FIGS. 14(a), (b), and (c).

The lens sheet 30A shown in FIG. 14(a) is an example in which the colored layer 33 does not follow the lens shape. Even in the case in which the boundary between the colored layer 33 and the base material layer 35 is a plane, this lens sheet 30A, as can be predicted from the comparison of FIGS. 10(A) and (B), achieves a better function than the body colored type. Additionally, because the colored layer 33 has the effect of approaching the lens part 32 side, it is preferable that the thickness of the colored layer 33 be less and the lens pitch, and preferably at least less than ½ the sheet thickness.

The lens sheet 30B shown in FIG. 14(b) is an example in which are formed a colored layer 33 that follows the shape of the lens part 32, a faintly colored base material layer 35B that does not contain a diffusing substance, and an intermediate layer (diffusing layer) 36 containing a diffusing agent, between the colored layer 33 and the base material layer 35B.

Figure 14C:
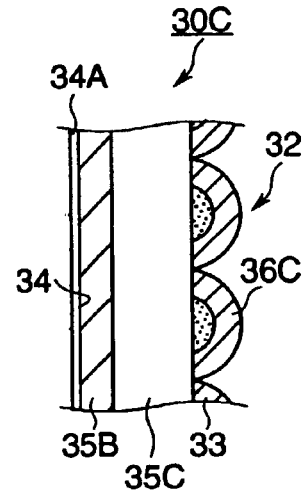

The lens sheet 30C shown in FIG. 14(c) is an example in which are formed a colored layer 33 that follows the shape of the lens part 32, a faintly colored base material layer 35B that does not contain a diffusing substance, a base material layer 35C that contains neither coloring nor a diffusing substance, and an intermediate layer (diffusing layer) 36C containing a diffusing agent, between the colored layer 33 and the base material layer 35C.

According to the lens sheets 30B and 30C, by means of a diffusing substance and a colored layer with low density, it is possible to effectively absorbed reflected external light.

Next, an embodiment will be described which prevents the occurrence of equal-thickness interference fringes (such as Newtonian rings) at the interference thickness range Is (shown in FIG. 16) between the lens sheet and the display panel, by providing a matte layer, having minute protrusions, on either the lens sheet or the surface of the display panel.

Figure 16:
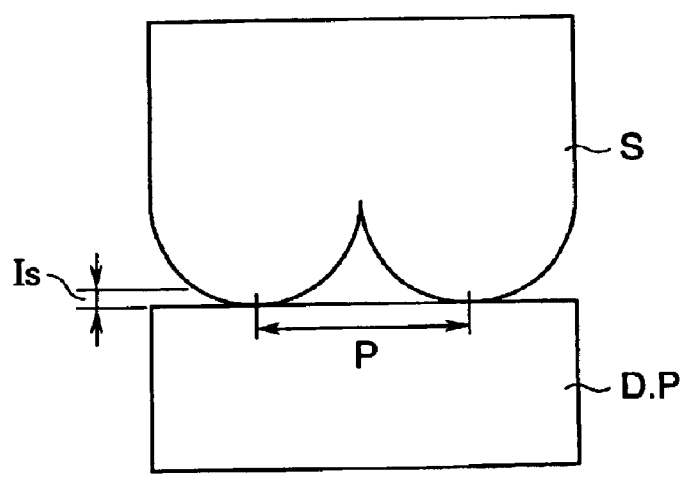
FIG. 16 is a simplified cross-section view showing the condition of the contact between the lens sheet and the display panel.
Figure 17:
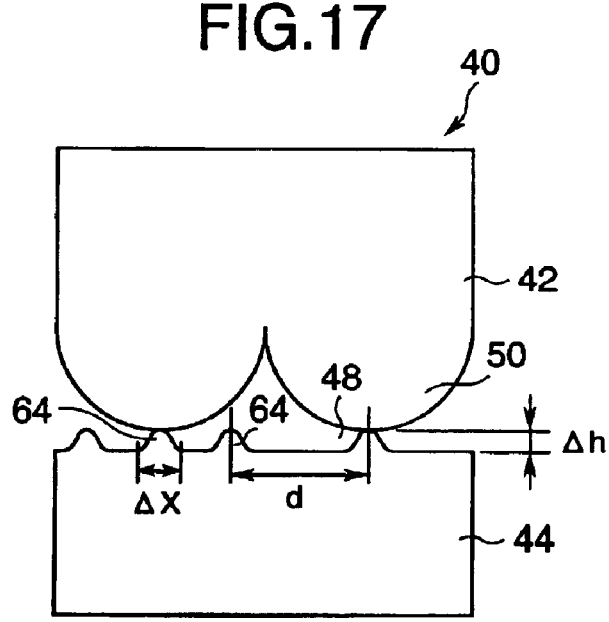
FIG. 17 is a simplified cross-section view showing yet another example of an embodiment of the present invention.
Figure 18:
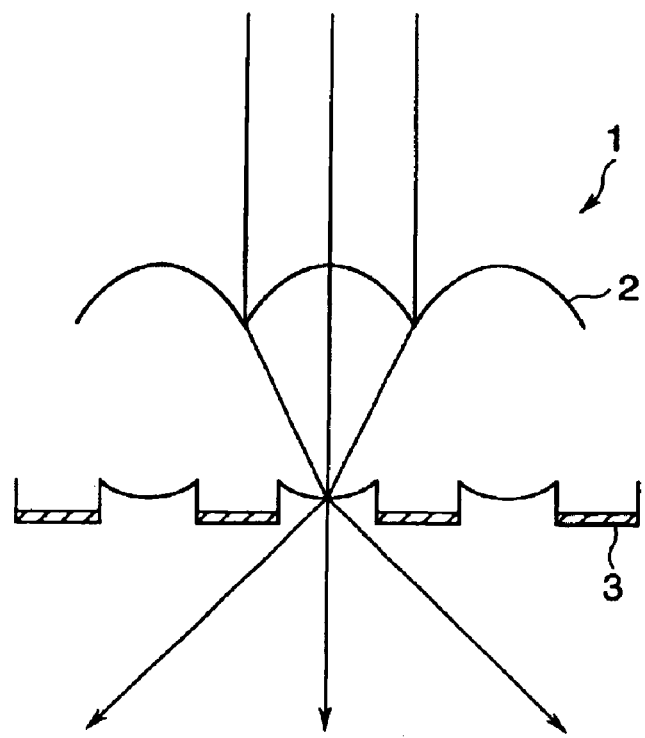
FIG. 18 is simplified cross-section view sowing a lens sheet with black stripes.

If the display panel DP and the convex lens layer of the lens sheet S make contact as is, a spacing of a certain thickness (the interference thickness) occurs for each lens pitch, as shown in FIG. 16, this inevitably causing interference with the wavelength of external light. To prevent this, in a display apparatus 40 of this embodiment, as shown in FIG. 17, the matte layer having a large number of minute protrusions 64 are formed between the lens sheet 42 and the display panel 44, thereby forming spacing 48 that is above the interference thickness, so that interference with visible light wavelengths does not occur.

More specifically, it is desirable that a matte layer having minute neighboring protrusions that are aperiodic, having a height of $\Delta h$, a width of $\Delta x$, and average diameter of d, is formed on both or one surface of contact between the lens sheet 42 and the display panel 44. The reference symbol P in the following denotes a periodic pattern of the unit lenses 46.

$\Delta h \geq 12.5$ μm
$\Delta x \leq 100$ μm
$d < 2P$

Next specific examples of the present invention are described in detail.

A first example lens sheet A is formed using a shock-resistant acrylic resin (index of refraction 1.51), to form lens parts with a pitch P of 0.2 mm, having a lens side horizontal diameter a of 0.12 mm and a vertical diameter b of 0.15 mm, the cross-sectional shape of the lenses being elliptical and the lens being arranged in parallel with each other in one direction, these being formed on a sheet having a thickness t0=1.0 mm, with a colored layer having a thickness t1=0.06 mm, the transmissivity of the lens sheet A being 663% and the reflectivity thereof being 11.7%.

A second example lens sheet B, with the exception of the lens vertical diameter b being 0.12 mm, is formed the same as the lens sheet A.

A third example lens sheet C, with the exception of being a body colored type, in which the entire lens part is colored, is formed the same as the lens sheet A. The transmissivity of the lens sheet C is 63.3%, an the reflectivity thereof is 27.8%.

A fourth example lens sheet D, with the exception of the lamination of a film formed as an anti-reflection layer on the light-exiting surface side of the lens sheet, is formed the same as the lens sheet A. The transmissivity of the lens sheet D is 63.3%, and the reflectivity thereof is 6.4%.

In the first example of the display apparatus, lens sheet A is disposed on a liquid-crystal display apparatus using as a display panel one having a polarizing sheet onto which are formed minute protrusion groups on the outer most surface on the observed side, so that the ridge lines of the lens sheet and the edges of the display panel make an angle of 5°.

The second example of the display apparatus, with the exception that the ridge lines of the lens sheet and the edges of the display panel make an angle of 85°, is the same as the first embodiment.

The third example of the display apparatus, with the exception of using the lens sheet C, is the same as the first embodiment.

The fourth example of the display apparatus, with the exception of using the lens sheet D, is the same as the first example.

The first comparison example, with the exception that the ridge lines of the lens sheet and the edges of the display panel make an angle of 0°, is the same as the first example.

The second comparison example, with the exception that the ridge lines of the lens sheet and the edges of the display panel make an angle of 90°, is the same as the first example.

The third comparison example, with the exception of using the lens sheet B, is the same as the first example.

The fourth comparison example, with the exception that the transmissivity of the lens sheet is made to be 38% by adjusting the amount of added coloring agent, is the same as the first example.

The fifth comparison example, with the exception the transmissivity of the lens sheet is made to be 72% by adjusting the amount of added coloring agent, is the same as the first example.

The sixth comparison example, with the exception that the outermost observed surface is a liquid-crystal display apparatus using a flat polarizer, is the same as the first example.

With regard to the above-noted first to fourth examples, and first to sixth comparison examples, the results of measurements of external reflected images, Moire effect, equal thickness interference fringes, display defocusing, and intensity are given in the following table.

TABLE 1

| | External reflected images | Moire effect | Equal thickness interference fringes | Display defocusing | Intensity (cd/m$^2$) |
|---|---|---|---|---|---|
| 1st example | Good | Good | Good | Good | 55 |
| 2nd example | Good | Good | Good | Good | 55 |
| 3rd example | Fair | Good | Good | Good | 55 |
| 4th example | Very good | Good | Good | Good | 57 |
| 1st comparison example | Good | Fair | Good | Good | 55 |
| 2nd comparison example | Good | Fair | Good | Good | 55 |
| 3rd comparison example | Good | Good | Good | Fair | 55 |
| 4th comparison example | Very good | Good | Good | Good | 28 (dark) |
| 5th comparison example | Bad | Good | Good | Good | 63 |
| 6th comparison example | Good | Good | Bad | Good | 57 |

By adopting the above-noted configuration, in a display apparatus, the present invention provides a wide viewing angle and good visibility, without the occurrence of fringe patterns on the display screen, and additionally prevents reflection of external light, while controlling the occurrence of the Moire effect.

What is claimed is:

1. A display apparatus having a lens sheet with a parallel arrangement of a plurality of unit columnar lenses, disposed on an observation side of a display panel, spaced therefrom by a layer of air, wherein, seen from said observation side, a direction of ridge lines of said unit columnar lenses and a direction of an edge of said display panel intersect at an angle of 5 to 85° at least in order to suppress the Moiré effect, and said lens sheet is disposed so that a focal point position of the unit columnar lenses thereof substantially coincides with a display surface of said display panel.

2. The display apparatus according to claim 1, wherein each columnar lens of said unit columnar lenses is a convex lens shape, and wherein said lens sheet is disposed so that the convex surface side of said unit columnar lenses faces said display panel.

3. The display apparatus according to claim 1, wherein a boundary with said air layer between said lens sheet and said display panel is provided with a colored layer.

4. The display apparatus according to claim 3, wherein said colored layer is formed along a lens shape of said unit columnar lenses.

5. The display apparatus according to claim 3, wherein a light transmissivity of said lens sheet is in the range 40% to 70%.

6. The display apparatus according to claim 1, wherein on at least one surface of a pair of opposing surfaces between said lens sheet and the display panel, is provide at least one element selected from a group consisting of a light-diffusing layer, an anti-reflection layer, an antiglare layer, an anti-static electricity layer, a hard coating layer, an anti-contamination layer, and a touch sensor.

7. The display apparatus according to claim 1, wherein said direction of ridge lines of said unit columnar lenses, seen from the observation side, and the direction of said edge of said display panel make an angle of 45°.

* * * * *